C. K. PUGH.
MULTIPLE EXPOSURE ATTACHMENT FOR CAMERAS.
APPLICATION FILED JUNE 16, 1915.
1,165,710.
Patented Dec. 28, 1915.
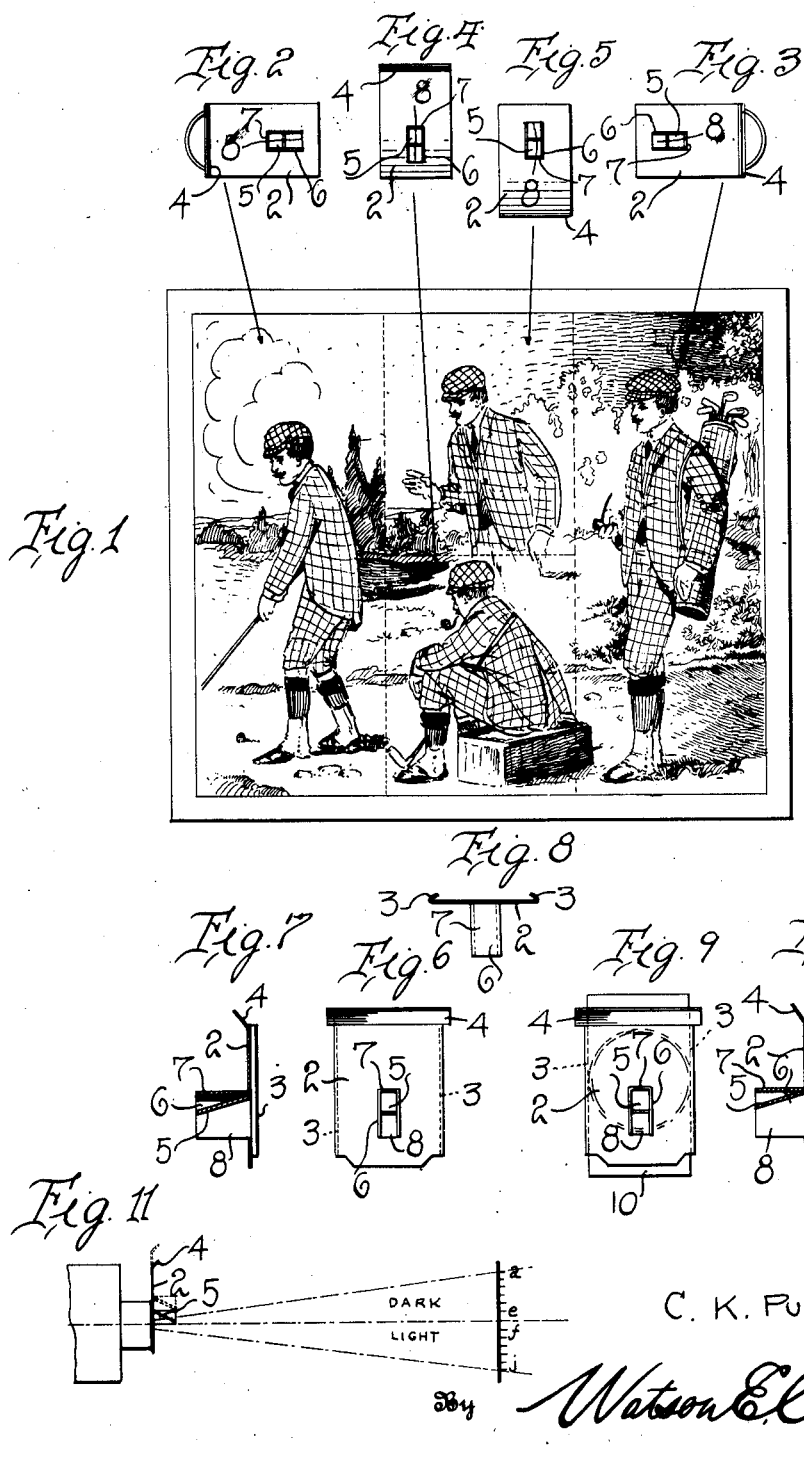
Inventor
C. K. Pugh
By Watson E. Coleman
Attorney

UNITED STATES PATENT OFFICE.

CHARLIE K. PUGH, OF COLORADO CITY, COLORADO.

MULTIPLE-EXPOSURE ATTACHMENT FOR CAMERAS.

1,165,710. Specification of Letters Patent. Patented Dec. 28, 1915.

Application filed June 16, 1915. Serial No. 34,450.

*To all whom it may concern:*

Be it known that I, CHARLIE K. PUGH, a citizen of the United States, residing at Colorado City, in the county of El Paso and State of Colorado, have invented certain new and useful Improvements in Multiple-Exposure Attachments for Cameras, of which the following is a specification, reference being had to the accompanying drawings.

This invention relates to photographic attachments, and particularly to a device adapted to be attached to any ordinary camera for the purpose of securing a plurality of exposures upon the same photographic plate or film.

The primary object of my invention is the provision of a very simple attachment for this purpose, so constructed that by an adjustment of the attachment, two, three or four pictures may be taken upon different portions of the plate.

A further object of the invention is to so construct the device that there will be no line of demarcation between pictures taken upon the same plate or film.

A further object is to so construct the attachment that pictures may be taken at the middle of the plate or film, these pictures being disposed, however, at different vertical positions upon the film.

Other objects will appear in the course of the following description.

My invention is illustrated in the accompanying drawings, wherein:

Figure 1 illustrates a multi-photograph as made by the use of my device; Fig. 2 is a view of my device so applied as to take one lateral portion of the picture; Fig. 3 is a like view to Fig. 2, but showing the device applied to take another lateral portion of the picture; Fig. 4 is a view of the device as applied to the camera for the purpose of taking the lower middle portion of the picture; Fig. 5 is a like view to Fig. 4, but showing the position of the device for taking the upper middle portion of the picture shown in Fig. 1; Fig. 6 is a face view of the attachment; Fig. 7 is a vertical sectional view of the attachment; Fig. 8 is a transverse sectional view thereof; Fig. 9 is a face view of a modified form of the attachment; Fig. 10 is a vertical sectional view thereof; Fig. 11 is a diagrammatic view to show the action of the wall 5.

My attachment, as illustrated in Figs. 6 to 8, comprises a plate of thin metal which is designated 2. The side edges of this plate are inwardly bent, as at 3, to form parallel guide flanges adapted to engage with or clamp upon the ring upon the front of a box camera, or the rim surrounding the lens of a folding camera in the same manner in which a duplicator is attached to a camera. At one end of the plate 2 an outwardly extending transverse flange 4 is formed, which flange is bent outward at less than a right angle to the plane of the plate 2, and as illustrated extends beyond the side edges of the plate. The plate 2 is slotted on a middle line extending longitudinally of the plate from the center of the plate. This slot is relatively narrow and the material cut out of the slot is bent outward at an inclination to form a tongue 5. Attached to the front of the plate 2 or formed integral therewith, or formed in any other desired manner is a rectangular box 6 having oppositely disposed parallel side walls, closed at one end as at 7 and being open along its outer end as at 8.

The device heretofore described, as before stated, is adapted to be slipped upon the ring upon the front of a box camera or the rim surrounding the lens of a folding camera and to be adjusted thereon as will now be described. Where it is desired that two laterally exposed views shall be taken upon one plate the device is adjusted as illustrated in Figs. 2 and 3. In other words, it is so adjusted as to leave an opening for about one-half or one-third of the diaphragm, the flange 4 cutting off the rays of light which would otherwise affect the other half or remainder of the plate. Either of the pictures may be taken first, and then the attachment is removed from the camera, reversed thereon, and the other half of the complete exposure made.

When it is desired that three pictures shall be taken upon the plate, that is, two lateral pictures and one middle picture which will extend practically the entire width of the plate, the lateral pictures are taken as described above, except that the attachment is set so as to leave an opening only about one-third of the diaphragm. This leaves one-third of the picture for the one central view. The attachment is then disposed upon the camera in the position shown in dotted lines in Fig. 11, so that the side walls of the box 6 shall cut out the extraneous light rays on each side of the central portion of the diaphragm and the central portion of the film or plate, but so that the light rays may enter the camera and act upon the entire central portion of the plate from top to bottom of the plate or film.

If it be desired to take two medially disposed views upon the same plate, one above another, the attachment is placed upon the camera as in Fig. 4, so that the tongue 5 will cut off light rays coming from above the axis of the lens, but light rays below the axis of the lens have free access to the camera. To form the second picture the attachment is removed and reversed in position and so disposed as in Fig. 5, that all light rays coming from below the axis of the lens are cut off by the tongue 5, but light rays coming from above the axis of the lens are allowed to enter the camera. Under these circumstances two pictures will be made upon the middle of the plate or film, one located vertically above the other.

If it be desired to take four pictures upon the same plate the device is arranged so as to take the two lateral views, each view occupying say one-third of the plate, and then the attachment is arranged so as to take the two middle views, one vertically disposed with relation to the other, and there will then be upon the plate four separate and distinct pictures, one on the left hand and one on the right hand and two in the middle disposed vertically above each other. I have found by experience that there will be no lines of demarcation between the several pictures but that the several pictures will blend into each other so as to look as if the picture was taken at one exposure.

It will be seen from Fig. 11 that the tongue in the projecting casing or box 6 is of considerable importance as it cuts off undesired slanting rays. It will be seen from Fig. 11 that the highest possible ray of light from the background that will be shown in the exposure for the attachment shown in the lower view comes from a point between *e* and *f*, and when the attachment is reversed to take the upper middle view the tongue cuts off the slanting rays from below *f*. That is, the lowest ray which can be admitted to the diaphragm comes from a point between *e* and *f*. When only one central view is taken it is necessary to slip the attachment on just far enough so that the rays of light from *a* and *j* and all the rays between will enter the camera, the result of which will be one middle exposure extending entirely across the plate. The flange 4 on the end of the plate 2 sustains the same relation to undesired slanting rays when side views are taken as does the tongue 5 when the central views are taken.

It will be seen that my invention is very simple and may be cheaply made, is adaptable to all cameras, and is thoroughly effective in practice.

It is to be noted that by reason of the fact that the plate 2 has a width equal to the diameter of the ring in a box camera or the lens mounting of a folding camera, the plate may be shifted diametrically across with relation to the lens or may be rotated with relation thereto, and that while I have described the use of my attachment for the purpose of taking two, three and four pictures upon the plate, yet it would be possible to take even more pictures upon the plate by properly adjusting the device so that the projecting box or casing 6 would take a plurality of angular positions with relation to the axis of the lens.

In Fig. 9 I show a slightly modified form of my invention in which a cap 9 is provided adapted to be slipped upon the lens housing of a camera, this cap having a rectangular plate 10 attached thereto in any suitable manner and with which the plate 2 has sliding engagement. It will be seen that by rotating the lens cap upon the lens housing and by sliding the plate 2 upon the plate 10 any desired adjustment of the attachment may be secured without removing the attachment from the plate 10 and without removing the lens cap from the camera. The tongue 5 acts to cut off extraneous light from entrance into the projecting casing or box 6. This tongue is shown as a separate piece from the end wall of the box, but it is obvious that this end wall of the box might be bent upward at the same angle as the tongue and the tongue omitted, and that the same result would be accomplished in either case. The tongue 5, therefore, in reality, constitutes the end wall of the casing or box 6 and is to be included within the term "end wall" as used in the appended claims. By reason of the projection of the side walls of the casing or box 6 extraneous light from the sides is cut off so that only the middle portion of the plate is open and light can not enter at an extreme angle and attack the plate. The same is true of the end wall formed by the tongue 5 and by the flange 4 which prevents the admission of extraneous light.

Having thus described my invention, what I claim is:

1. A multiple exposure attachment for cameras comprising a body adapted to be attached to the camera in front of the lens thereof and having radial movement in relation thereto, said body at one end having an outwardly turned flange for cutting off extraneous light rays.

2. A multiple exposure attachment for cameras comprising a body adapted to be attached to the camera in front of the lens thereof, said body having an exposure opening bounded for a portion of its length by an outwardly extending wall.

3. A multiple exposure attachment for cameras comprising a body adapted to be attached to the camera in front of the lens, said body having radially sliding movement relative to the axis of the lens and also being rotatably adjustable around said axis, said body having at one end an outwardly turned flange for cutting off extraneous light rays but permitting the entrance of light to one portion of the lens.

4. A multiple exposure attachment for cameras comprising a body adapted to be attached to the camera in front of the lens and having radial sliding movement relative thereto and being rotatable around the axis of the lens, said body having at one end an outwardly turned flange for cutting off extraneous light rays, the middle of the body adjacent one end being longitudinally slotted.

5. A multiple exposure attachment for cameras comprising a body adapted to be attached to the camera in front of the lens and having radially sliding movement relative thereto and being rotatable around the axis of the lens, said body having at one end an outwardly turned flange for cutting off extraneous light rays, the middle of the plate adjacent one end being longitudinally slotted, said slot having outstanding side walls and an outstanding end wall, the opposite end being open.

6. A multiple exposure attachment for cameras comprising a plate adapted to be attached to the camera in front of the lens and having radial sliding movement in relation thereto and adapted to be angularly adjusted with relation to the axis of the lens, the plate having at one end an outwardly inclined flange, the middle of the plate adjacent one end being longitudinally slotted, said slot having outwardly projecting side walls, the inner end of the slot having an outwardly projecting end wall, said end wall being inclined reversely to the inclination of the flange on the end of the plate.

7. A multiple exposure attachment for cameras comprising a plate the lateral margins of which are bent to form flanges adapted to slidingly engage a portion of the camera, said plate at one end being formed with an outwardly extending flange bent at less than a right angle to the plane of the plate, the plate being formed along its longitudinal middle line with a slot extending outward parallel to the side edges of the plate, side walls extending outward from each side of the slot and an end wall extending outward from the inner end of the slot.

In testimony whereof I hereunto affix my signature in the presence of two witnesses.

CHARLIE K. PUGH.

Witnesses:
J. A. BARTON,
W. R. WATERTON.